(12) United States Patent
Cindric et al.

(10) Patent No.: US 11,441,771 B1
(45) Date of Patent: Sep. 13, 2022

(54) HANDHELD IMPLEMENT WITH LIGHT

(71) Applicants: Owen Cindric, Slickville, PA (US);
Brett White, Slickville, PA (US)

(72) Inventors: Owen Cindric, Slickville, PA (US);
Brett White, Slickville, PA (US)

(*) Notice: Subject to any disclaimer, the term of this patent is extended or adjusted under 35 U.S.C. 154(b) by 0 days.

(21) Appl. No.: 16/426,693

(22) Filed: May 30, 2019

(51) Int. Cl.
F21V 33/00 (2006.01)
F21V 23/04 (2006.01)
F21V 21/088 (2006.01)
A46B 17/08 (2006.01)
A47L 13/50 (2006.01)
A01B 1/06 (2006.01)
A01B 1/02 (2006.01)
A01D 7/00 (2006.01)

(52) U.S. Cl.
CPC .......... *F21V 33/008* (2013.01); *F21V 21/088* (2013.01); *F21V 23/0414* (2013.01); *A01B 1/02* (2013.01); *A01B 1/06* (2013.01); *A01D 7/00* (2013.01); *A46B 17/08* (2013.01); *A47L 13/50* (2013.01)

(58) Field of Classification Search
CPC .. F21V 33/008; F21V 21/088; F21V 23/0414; A01B 1/06; A01B 1/02; A46B 17/08; A47L 13/50; A01D 7/00
See application file for complete search history.

(56) References Cited

U.S. PATENT DOCUMENTS

| 5,540,470 | A | * | 7/1996 | Lu | E01H 1/1206 |
| | | | | | 15/257.6 |
| 6,565,227 | B1 | | 5/2003 | Davis | |
| 7,484,859 | B1 | * | 2/2009 | Burke | A47L 13/52 |
| | | | | | 15/257.1 |
| 10,000,901 | B1 | * | 6/2018 | Gallo | F21V 33/0084 |
| 10,542,653 | B1 | * | 1/2020 | Liversedge | F21V 33/0084 |
| 10,577,765 | B2 | * | 3/2020 | Fulbrook | E01H 1/1206 |
| 2003/0095781 | A1 | | 5/2003 | Williams | |
| 2012/0256432 | A1 | * | 10/2012 | Best | F21V 33/0084 |
| | | | | | 294/49 |
| 2013/0313843 | A1 | * | 11/2013 | Hernandez | A01B 1/022 |
| | | | | | 294/51 |
| 2017/0370058 | A1 | * | 12/2017 | Herrera | A01B 1/02 |
| 2019/0127935 | A1 | * | 5/2019 | Campbell | E01H 5/02 |
| 2020/0288618 | A1 | * | 9/2020 | Davey | A01B 1/02 |

OTHER PUBLICATIONS

Thomas, Shane, International Search Report for PCT/US2020/035221, dated Oct. 8, 2020, 5 pages.

* cited by examiner

Primary Examiner — Kevin Quarterman
(74) Attorney, Agent, or Firm — Ference & Associates LLC

(57) ABSTRACT

An embodiment provides a handheld implement, including: an elongated handle comprising a first end and a second end substantially opposite the first end; an implement head located at and mechanically attached to one of: the first end and the second end; and a light source mechanically coupled to and along a longitudinal axis of the elongated handle, wherein the light source is positioned at a location on the elongated handle such that a least a portion of light that emits from the light source illuminates an area proximate to the implement head. Other aspects are claimed and described.

17 Claims, 3 Drawing Sheets

HANDHELD IMPLEMENT WITH LIGHT

BACKGROUND

Handheld implements, particularly those with long handles, allow a person to perform a task that may located on or near ground or floor level without requiring the person to bend over or otherwise get down to the ground or floor level, thereby reducing muscle fatigue and/or injuries due to the frequent bending over that would be required to perform tasks. Thus, people use handheld implements (e.g., shovels, rakes, hoes, mops, brooms, etc.) to perform a variety of indoor and outdoor tasks. For example, a person may use a snow shovel to scoop snow from a driveway or sidewalk. As another example, a person may use a mop to clean a kitchen floor.

The handheld implements are generally designed to perform specific tasks (e.g., a shovel is used for digging or scooping, a mop is used for cleaning, etc.) and, therefore, have different handheld implement heads (e.g., a mop head, a broom head, a shovel head, etc.). Additionally, a handheld implement may fall into a broad category or type (e.g., rake, shovel, broom, etc.) that has other specific implement sub-types that are unique for particular tasks. For example, while a leaf rake and a garden rake are both types of rakes, each of these sub-types has advantages for use in a particular task over other rake sub-types. However, regardless of the sub-type or even overarching implement type, the handheld implements generally all employ a similar long elongated handle that is attached to the implement head.

BRIEF SUMMARY

One embodiment provides a handheld implement, comprising: an elongated handle comprising a first end and a second end substantially opposite the first end; an implement head located at and mechanically attached to one of: the first end and the second end; and a light source mechanically coupled to and along a longitudinal axis of the elongated handle, wherein the light source is positioned at a location on the elongated handle such that a least a portion of light that emits from the light source illuminates an area proximate to the implement head.

Another embodiment provides a mechanical coupler for coupling a light source to a handheld implement, comprising: a clip having a first portion for holding a light source and having a second portion for attachment to a handheld implement; the first portion comprising an attachment mechanism for coupling the light source to the clip; the second portion comprising two opposing contoured legs, wherein one of the two opposing contoured legs is positioned on a first side corresponding to a longitudinal axis of an elongated handle of the handheld implement and wherein the other of the two opposing contoured legs is positioned on a second side corresponding to the longitudinal axis and opposite the first side of the elongated handle, thereby attaching to the elongated handle.

Another embodiment provides a handheld implement, comprising: an elongated handle comprising a first end and a second end substantially opposite the first end; an implement head located at and mechanically attached to one of: the first end and the second end; a light source mechanically coupled to and along a longitudinal axis of the elongated handle, wherein the light source is positioned at a location on the elongated handle such that a least a portion of light that emits from the light source illuminates an area proximate to the implement head, wherein the light source is mechanically coupled to the elongated handle via a clip; a characteristic of the light source being user-modifiable, wherein the characteristic is selected from the group consisting of: a beam-size of the light source and a position of the light source on the elongated handle; and a power source powering the light source, wherein the power source is selected from the group consisting of a solar cell and a battery.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3B-1 illustrates an illustrative example of a spring clip for coupling a light source to a handheld implement handle.

FIG. 3B-2 illustrates movement of the spring clip of FIG. 3B1.

DETAILED DESCRIPTION

Figure 1A:
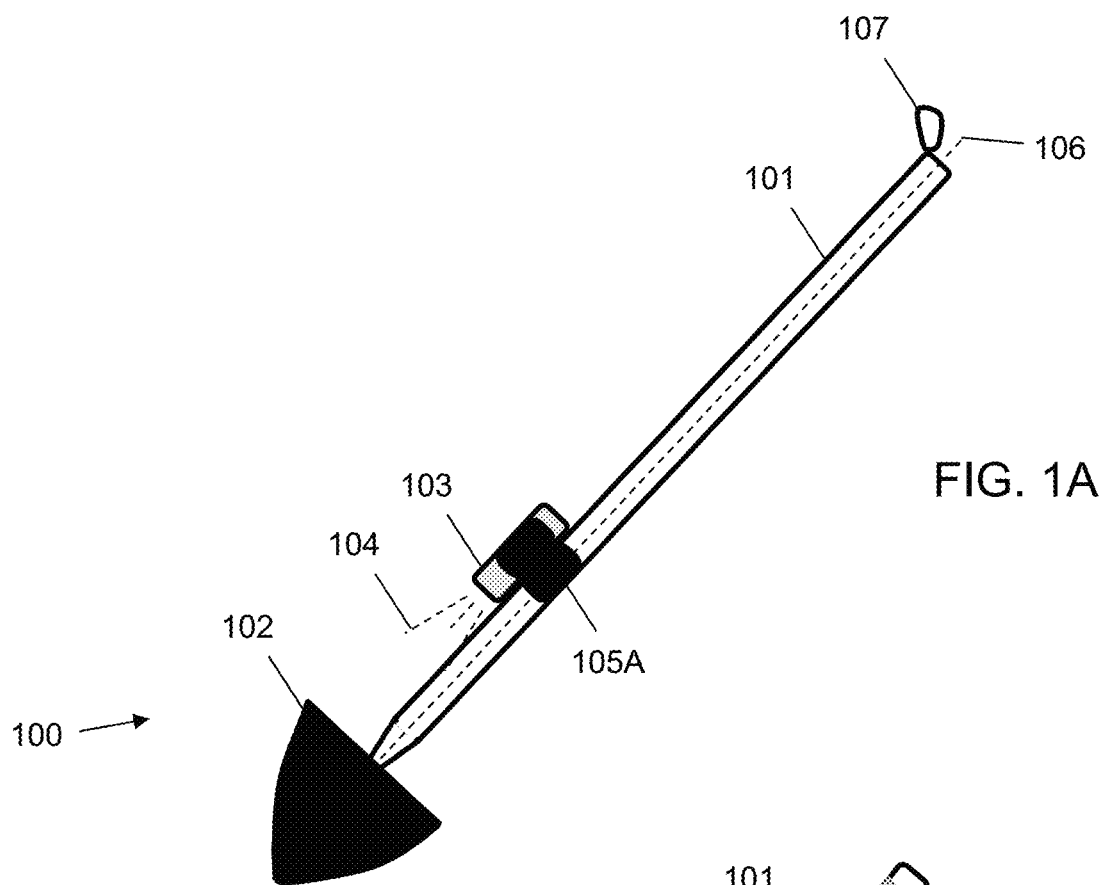
FIG. 1A illustrates an illustrative example of a handheld implement having a light source coupled to the implement handle using a clip.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Since people use handheld implements, particularly those with a long elongated handle, for many different tasks, sometimes these tasks require the use of the implement in a low light situation. For example, a person may need to use a shovel during dusk or after night has fallen. As another example, a person may need to use a broom in a closet that does not have very good lighting with respect to the floor of the closet. The solution to this problem is to turn on other lights that help illuminate the area where the user is attempting to perform the task. For example, if the user is attempting to shovel snow from his/her driveway, the user may turn on lights that are directed at the driveway so that he/she can see the driveway. As another example, if the user is attempting to sweep a corner of the closet, the user may turn on lights in the main room to help illuminate the floor of the closet.

One problem with such a solution is that the light may be illuminating a significantly greater area than what is needed by the user. For example, if the user is attempting to dig a hole in a specific spot in the yard, by turning on the outdoor lights, the user ends up illuminating the entire yard. This can be disruptive to other people (e.g., neighbors, other people in the house, etc.). Additionally, since the light covers a large portion, it is not focused on the location that the user is attempting to work, which can result in poor lighting conditions for the user. Another problem, for example in connection with sweeping the floor of the closet, is that the lighting from the connected room may still not reach the corner that the user is trying to sweep. A solution to these problems is to set-up task lighting that illuminates the desired location. However, this can be cumbersome and time-consuming, often times requiring more time for setup than it will take to perform the task.

Accordingly, an embodiment provides a handheld implement that includes a light source. Specifically, a light source can be mechanically coupled to the handle of the handheld implement (e.g., via an attachment mechanism, by manufacturing the light source integral to the handle, etc.). As known, the handheld implement (e.g., rake, shovel, mop, broom, hoe, etc.) includes an elongated handle and an implement head corresponding to the implement type attached to one end of the handle. The described system additionally includes a light source that is mechanically coupled to and along a longitudinal axis of the handle of the handheld implement. For example, the light source may be integral to the handle, for example, by manufacturing the handle to include the light source. As another example, the light source may be coupled to the handle using an attachment mechanism that holds a light source and also clips to or otherwise couples to the handle.

The light source is positioned on the handle such that light emitting from the light source illuminates an area near the implement head. In other words, the light source is positioned so that light emitting from the light source is directed towards the implement head, thereby illuminating an area around the implement head and providing "task lighting" for a user performing a task with the implement. The light source may be positioned along the handle so that it does not interfere with the placement of the user's hands, but also provides enough light for performing the task. In the case that the light source is not integrated into the handle, for example, in the case that the light source is clipped to the implement handle using a clip, this positioning may be selected by the user. In the case that the light source is integrated into the handing, this positioning may be selected by the implement manufacturer.

The illustrated example embodiments will be best understood by reference to the figures. The following description is intended only by way of example, and simply illustrates certain example embodiments.

Figure 1B:
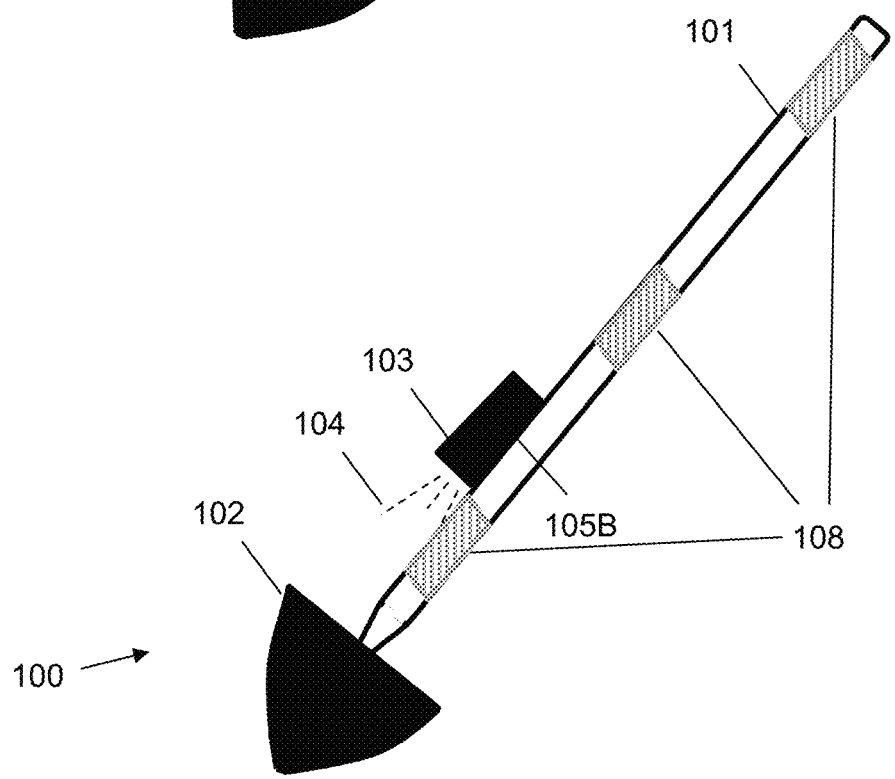
FIG. 1B illustrate an illustrative example of a handheld implement including an integral light source.

FIG. 1A and FIG. 1B illustrate examples of a handheld implement having a light source 100. FIG. 1A illustrates the light source coupled to the implement handle using an attachment mechanism. FIG. 1B illustrates the light source integral to the implement handle. The handheld implement 100 may include an elongated handle 101 comprising a first end and a second end substantially opposite the first end. The elongated handle 101 may be any conventional handle that is used on a handheld implement (e.g., shovel, rake, hoe, broom, mop, etc.). Thus, the handle may be a straight handle, ergonomic handle, or any other handle of a handheld implement. The handheld implement 100 may also include an implement head 102 located at and mechanically attached to either the first end or the second end. While a spade shovel head is shown in the figures as the implement head 102, the implement head may be any handheld implement head type (e.g., shovel head, rake head, mop head, broom head, hoe head, etc.) and/or sub-type (e.g., snow shovel head, scoop shovel head, spade shovel head, leaf rake head, garden rake head, sponge mop head, etc.). Additionally, the implement head may be mechanically attached to the elongated handle using any of the conventional techniques for attaching an implement head to an elongated handle.

The handheld implement 100 additionally includes a light source 103. The light source may be any type of light source, for example, a light source includes light-emitting diodes (LED), incandescent bulbs, fluorescent bulbs, and the like. Depending on the mechanical coupling of the light source 103 to the handle 101, discussed in more detail below, the light source 103 may be a light source manufactured for the handheld implement 100 or may be a light source 103 purchased by a user and then used in conjunction with the handheld implement 100 and attachment mechanism, also discussed in more detail below. Therefore, the light source 103 may simply be bulbs, LEDs, or other light sources, including any circuitry necessary for powering the light sources, that are arranged on the handle 101 by a manufacturer. Alternatively, the light source 103 may be a flashlight, or other purchasable light source, that is purchased by a user to attach to the handle 101.

The light source 103 is mechanically coupled to the elongated handle 101 along a longitudinal axis (illustrated by the dashed line 106 in FIG. 1A) of the handle 101. In other words, the light source 103 is located substantially parallel along the long edge, or lengthwise, portion of the handle 101 as opposed to being located at one end of the handle or the other. The light source 103 is positioned at a location on the handle 101 such that at least a portion of light emitting 104 from the light source 103, when the light source 103 is powered on, illuminates an area proximate to the implement head 102. In other words, the light source 103 is positioned along the handle 101 so that light emitting 104 from the light source is pointed towards the implement head 102.

The exact location of the light source 103 on the handle 101 may vary based upon whether the light source 103 is positioned by a user or integral to the handle. However, the location of the light source 103 on the handle 101 will generally be at a location that does not interfere with the user's hands when the user is using the handheld implement 100, but still provides enough light for the user to perform the desired task, also referred to as "task lighting". Thus, the location of the light source 103 on the handle 101 may be closer to the implement head end of the handle so that the user still has full use of the handle and also so that the user's hands do not block the light source while the user is using the implement. Additionally, the location may be far enough back from the implement head so that an area proximate to the implement head is illuminated, rather than only a small focused area being illuminated.

The difference between FIG. 1A and FIG. 1B is the mechanical coupling that is used to attach the light source 103 to the handle. FIG. 1B illustrates a light source 103 that is mechanically coupled to the handle 101 via an integration 105B of the light source 103 into the handle 101. In other words, the light source 103 of FIG. 1B is integrated into the implement handle 101. This integration technique may occur when the manufacturer of the handheld implement 100 or the manufacturer of the implement handle 101 includes the light source 103 in the manufacturing of the handle 101. The protrusion for the light source 103 is exaggerated in FIG. 1B for illustrative purposes. However, it should be understood that the protrusion or feature that houses the light source 103 could be a different size, different shape, or the like. For example, since the light source 103 is manufactured into the handle 101, the manufacturer may only include three or four LEDs that would require a very small feature or protrusion. The light source 103 may be integrated into the handle 101 using a variety of manufacturing techniques. For example, the handle 101 with one or more protrusions or features for the light source(s) 103 may be manufactured using, injection molding, forging, extrusion, spooling, or any other manufacturing process that can be used to create the handle 101. The light source 103 and any associated circuitry may then be inserted or otherwise placed into the correct location within the manufactured handle 101.

FIG. 1A illustrates a light source 103 that is mechanically coupled to the handle 101 using an attachment mechanism 105A, also referred to as a mechanical coupler. The attachment mechanism 105A allows a user to position the light source 103 at any location on the handle 101, thereby making the position of the light source 103 user-modifiable. Additionally, the attachment mechanism 105A allows a user to use any purchasable light source 103, for example, a flashlight. Additionally, the use of the attachment mechanism 105A allows for adding a light source 103 to handheld implements that do not have a light source 103, thereby minimizing the cost to the user. The attachment mechanism 105A may include any type of attachment mechanism that allows coupling of the light source 103 to the handle. Thus, the attachment mechanism 105A can be as simple as zip ties, rope, twist ties, or the like. However, it is contemplated in this application that the attachment mechanism 105A allows for a more sturdy connection of the light source 103 to the handle. Accordingly, the attachment mechanism 105A may include a clip (e.g., a spring clip, a tension clip, etc.) or other mechanical attachment mechanism that squeezes the handle 101 and allows for connection of the light source 103 to the attachment mechanism 105A. Although implement handles are traditionally round or circular in cross-sectional shape, the attachment mechanism 105A may be designed to fit any cross-sectional shape, for example, square, rectangular, triangular, hexagonal, or the like.

Figure 3A:
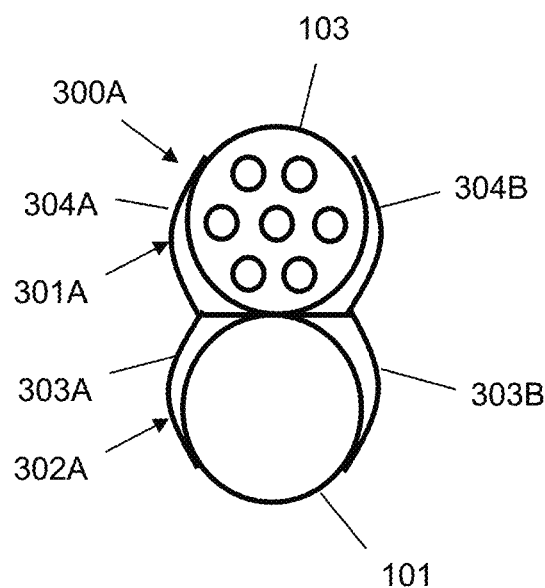
FIG. 3A illustrates an illustrative example of a tension clip for coupling a light source to a handheld implement handle.

FIGS. 3A and 3B-1 and 3B-2 illustrate two possible attachment mechanisms 105A. In FIG. 3A the attachment mechanism 105A is a tension clip 300A. The tension clip 300A includes a first portion 301A and a second portion 302A. The first portion 301A is the portion of the clip 300A that holds the light source 103. The second portion 302A is the portion of the clip 300A that attaches to the handle 101. While the illustration of FIG. 3A illustrates a clip having both a portion that provides tension around the light source 103 and a portion that provides tension around the handle 101, it should be understood that the term "tension clip" refers to the portion 302A that attaches to the handle 101. In other words, the first portion 301A holding the light source 103 may be of a different configuration that does not hold the light source 103 using tension. Other configurations, or coupling mechanisms, for holding the light source 103 or attaching the light source 103 to the attachment mechanism 105A are discussed in more detail herein.

The second portion 302A for attachment to the handle 101 is a tension mechanical coupling. In other words, the second portion 302A is sized and designed with interior contours that match or at least follow the shape of the handle 101. The second portion 302A includes two opposing contoured legs 303A and 303B. These legs 303A and 303B, when the tension clip 300A is attached to a handle 101, are positioned on opposing lengthwise sides of the handle 101. In other words, one contoured leg 303A or 303B is positioned on a first side corresponding to the longitudinal axis of the handle 101, while the other contoured leg 303A or 303B is positioned on the opposing or second side corresponding to the longitudinal axis of the handle 101. In other words, the FIG. 3A illustrates a cross-sectional view of the light source 103 attached to the handle 101 using the tension clip 300A.

The second portion 302A also includes an opening that allows for sliding the second portion 302A over the handle 101 of the implement. When sliding the second portion 302A over the handle 101 the contoured legs 303A and 303B open, or move away from each other, to accept the handle 101. Once in place, the contoured legs 303A and 303B "snap" back into their original position, thereby providing tension around the handle 101, effectively squeezing the handle 101 so that the tension clip 300A stays in the position that the user placed the tension clip 300A. In the case that the first portion 301A is also a tension clip, the attachment process would be similar except that the contoured arms 304A and 304B of the first portion 301A would open and close around the light source 103.

Figures 1, 2, 3B:
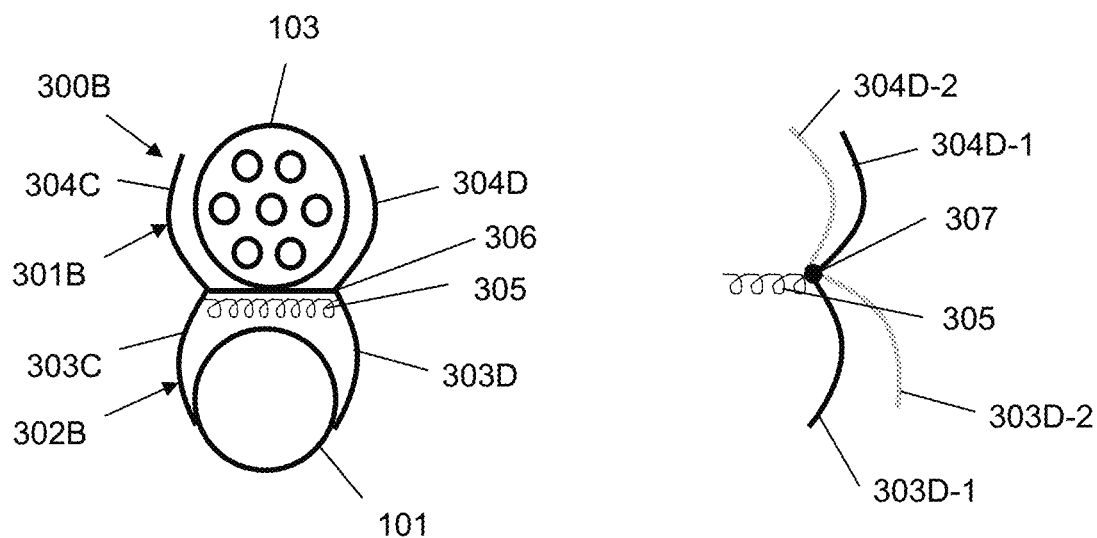

FIG. 3B-1 illustrates an example spring clip 300B. The spring clip 300B includes a first portion 301B and a second portion 302B. In this example, the first portion 301B includes handles or arms 304C and 304D that operate the opening of the spring clip 300B. Thus, this first portion 301B does not hold the light source 103. However, it should be understood that the spring clip 300B may also include a light source tension mechanism to hold the light source 103, as described with regard to the tension clip 300A. The second portion 302B includes two opposing contoured legs 303C and 303D that are positioned around the handle 101. The spring clip 300B also includes a spring 305 that is positioned between the two contoured legs 303C and 303D. The spring 305 could also be positioned in a different location, for example, between the two contoured arms 304C and 304D.

However, the purpose of this spring 305 is to provide tension between the two contoured legs 303C and 303D causing the two contoured legs 303C and 303D to pull towards each other in a "neutral" position. In other words, when no other force acts on the spring clip 300B, the contoured legs 303C and 303D will be pulled towards each other by the spring 305. The spring 305 may be of a size that allows for the contoured legs 303C and 303D to remain partially open (i.e., the two legs 303C and 303D are not touching) or fully closed (i.e., the two legs 303C and 303D touching) when in the neutral position. When in use (i.e., positioned around the handle), the spring 305 causes the two legs 303C and 303D to pull toward each other and squeeze the handle 101, thereby keeping the spring clip 300B to remain in position around the handle.

In order to position the spring clip 300B around the handle 101 a user may squeeze the arms 304C and 304D towards each other, thereby causing the legs 303C and 303D to move away from each other to create an opening that will fit around the handle 101. Once positioned, the user can release the arms 304C and 304D, thereby causing the legs 303C and 303D to move back towards each other and squeeze the handle 101. FIG. 3B-2 illustrates an example of this movement. 304D-1 and 303D-1 illustrates the neutral position of the arms 304C and 304D and legs 303C and 303D. In other words, 304D-1 and 303D-1 illustrates the position of the arms 304C and 304D and legs 303C and 303D when a user is not applying a force to the arms 304C to 304D. 304D-2 and 303D-2 illustrates the movement when the user squeezes the arms 304C and 304D towards each other. FIG. 3B-2 also illustrates a pivot point 307 that allows the movement of the arms 304C and 304D and legs 303C and 303D. This pivot point 307 may be a pin, rod, or any other mechanism that allows for movement of the arms 304C and 304D and legs 303C and 303D.

Figure 3C:
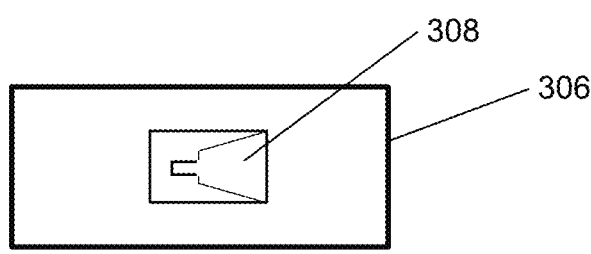
FIG. 3C illustrates an illustrative example of an attachment mechanism for coupling the light source to the clip.

In this example, the light source 103 is attached to the spring clip 300B using a coupling mechanism 306. The coupling mechanism 306 may be one of a variety of different coupling mechanisms. For example, the coupling mechanism may include a slot and tab as illustrated in FIG. 3C. In this case the coupling mechanism 306 includes a slot 308 for accepting a tab of the light source 103. In this example, the tab of the light source can be slid into the slot 308, thereby attaching the light source to the coupling mechanism 306. This configuration could also be reversed where the coupling mechanism 306 includes the tab and the light source 103 includes the slot. Other possible coupling mechanisms include a buckle and tab, snaps and snap receivers, multiple tabs and slots, hook and loop, and the like.

Figure 2A:
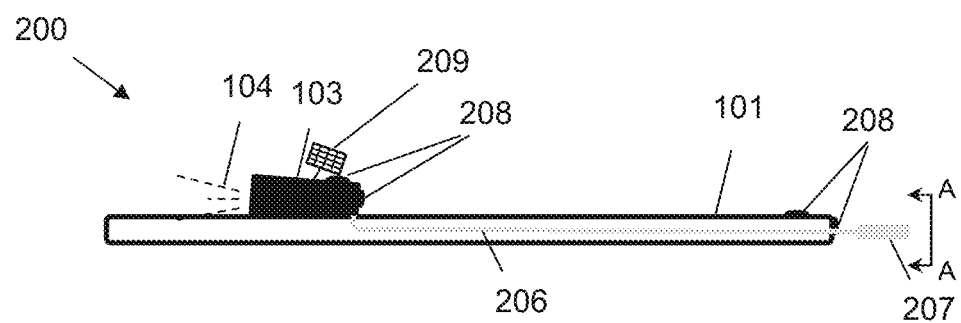
FIG. 2A illustrates an illustrative example of a handheld implement handle including a power cable and power source.

The handheld implement may include additional components for powering and controlling characteristics of the light source and/or other features of the handheld implement. FIG. 2A illustrates a handheld implement 200 having some of these additional components. It should be understood that these components may be included with either the handheld implement having the light source coupled using the attachment mechanism, FIG. 1A, or the handheld implement having the light source integrated into the handle, FIG. 1B. One component that may be included is a power source for the light source 103. In the illustration of FIG. 2A a solar cell power source 209 is illustrated. However, other power sources may be additionally or alternatively included. For example, the light source 103 power source may be a rechargeable battery, non-rechargeable battery, or the like. A battery may be located within the light source enclosure, for example, like in a flashlight, or may be included in the handle 101 and accessible through a door, slot, or other opening within the handle 101.

Figure 2B:
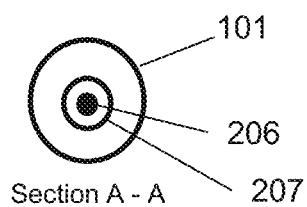
FIG. 2B illustrates an illustrative example of a handheld implement handle having a power cable internal to the handle.
Figure 2C:
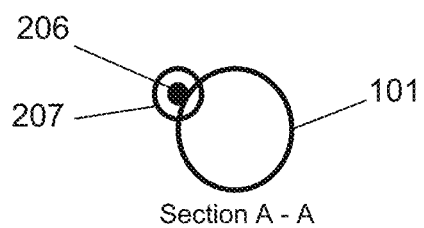
FIG. 2C illustrates an illustrative example of a handheld implement handle having a power cable external to the handle.

In connection with a power source, the handheld implement 200 may include a power cable 206. The power cable 206 may be external or internal to the implement handle 101. FIG. 2B illustrates a cross-sectional view A-A of the power cable 206 internal to the implement handle 101. FIG. 2C illustrates a cross-sectional view A-A of the power cable 206 external to the implement handle 101. In the case of an external power cable, the power cable 206 may be attached to the handle 101 using one or more attachment devices, for example, cable ties, rope, adhesive, or the like. The power cable may provide power to either the light source 103 or to a rechargeable power source of the implement 200. For example, if the power source is a rechargeable battery, the implement may include the power cable 206, including a power connector, coupler, or plug, 207, that allows a user to plug the implement into a wall power source or outlet in order to charge the rechargeable battery.

The power connector, coupler, or plug 207 may be located at the end of the handle 101 opposite the implement head 102, not shown in FIG. 2A. Thus, the power cable 206 may terminate proximate to the end of the handle 101 opposite the implement head 202. The power connector, coupler, or plug, 207, may be any kind of power connector or plug. For example, the plug 207 may be of a type that can be plugged directly into an outlet. As another example, the connector 207 may be a type that plugs into another connector at the end of a cable that then plugs into an outlet. As another example, the connector 207 may be a type that plugs into a device, for example, an AC/DC converter device, a power pack, or the like, that provides power to the light source 103 through the power cable 206.

In order to control the light source 103, the handheld implement 101 may include one or more buttons that control the operation of the light source. A button may include any type of button or switch, for example, a pushbutton, on/off switch, toggle switch, press-and-hold button, or the like. FIG. 2A illustrates four different possible locations for the button(s) 208. These examples include the button being located on the top of the light source 103, the button being located on the back of the light source 103 (i.e., the end of the light source away from the implement head, not illustrated), the button being located on a lengthwise side of the handle 101 proximate to the end of the handle 101 opposite the implement head, and the button being located on the end of the handle 101 opposite the implement head. However, other positions and locations for the button(s) are possible and contemplated.

The implement 200 may include one or multiple buttons, and, in the case of multiple buttons, the buttons may be located in different locations of the implement 200. These locations may be chosen based upon the function that the button is to control. For example, a power button used to turn the light source 103 off and on may be located in a location closest to the user's hand while a button used to control a characteristic of the light source may be located on the light source 103. Some characteristics of the light source 103 that may be user controllable or modifiable include the size of the beam of light, whether the light is intermittent or strobing, the color of the light being emitted by the light source 103, or the like.

The handheld implement may also include other components. For example, the handheld implement may include a hanging loop 107. The hanging loop 107 allows a user to hang the handheld implement 100 from a hook or other hanging mechanism. The hanging loop 107 may be a flexible material or may be a non-flexible material that is shaped into a loop. The handheld implement may also include one or more segments of reflective material 108 (e.g., reflective tape, reflective fabric, reflective paint, etc.) attached or otherwise coupled to the handle, for example, using an adhesive, through a mechanical coupling, by virtue of the reflective material, or the like. For example, reflective tape may be attached to the handle in order to make a person using the handheld implement more visible at night or in other low-light conditions. While the example of three segments of reflective material are shown in FIG. 1B, the number and locations of the reflective material may be different than this example. Additionally, each segment of reflective material may be created by smaller pieces of reflective material. For example, a single segment may have multiple strips of reflective tape making up the entire single segment.

The handheld implement 100 may also include components that are unique to the implement type or sub-type. For example, in the case of a snow shovel, the snow shovel implement head may include heating wires or cables that allow for heating the snow shovel implement head to prevent snow and/or ice build-up on the snow shovel implement head. As another example, a leaf rake may include tubing that allows for air to be blown onto the rake head in order to dislodge leaves from the implement head.

Thus, the described systems and methods provide a handheld implement that includes a light source that can provide task lighting for a user. Instead of needing to set up cumbersome task lighting, the user simply has to push a button on the implement and turn on the light source that is attached to the implement handle. Additionally, unlike solutions that require turning on lights that flood a large area, the handheld implement light source provides light to the area proximate to the implement head without disturbing other people with the large light path. Additionally, since the light source can be either integral to the handle or mechanically coupled to the handle using an attachment mechanism, the system provides a technique that can be used with new implement manufacturing processes or used with existing handheld implements without requiring purchase of expensive handheld implement components.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A handheld implement, comprising:
   an elongated handle comprising a first end and a second end substantially opposite the first end;
   an implement head located at and mechanically attached to one of: the first end and the second end; and
   a light source mechanically coupled to, via an attachment mechanism, an external portion of and along a longitudinal axis of the elongated handle, wherein the light source is removable from the attachment mechanism, wherein the light source is positioned at a location on the elongated handle such that a least a portion of light that emits from the light source illuminates an area proximate to the implement head, wherein the attachment mechanism is removable from the elongated handle and positionable at a plurality of locations along the longitudinal axis of the elongated handle, and wherein the attachment mechanism receives and holds the light source utilizing contoured arms, wherein a first of the contoured arms is positioned on one side of the light source when the light source is located within the attachment mechanism and wherein a second of the contoured arms is positioned on another side of the light source substantially opposite the first contoured arm.

2. The handheld implement of claim 1, wherein attachment mechanism comprises a clip selected from the group consisting of: a spring clip and a tension clip.

3. The handheld implement of claim 1, further comprising a power source powering the light source.

4. The handheld implement of claim 3, wherein the power source is selected from the group consisting of a solar cell and a battery.

5. The handheld implement of claim 1, further comprising a power cable electrically coupled to the light source and having a plug terminating proximate to the end substantially opposite the implement head.

6. The handheld implement of claim 5, wherein the power cable, when attached to a power source, provides power to at least one of: the light source and a rechargeable power source of the light source.

7. The handheld implement of claim 1, wherein a characteristic of the light source is user-modifiable, wherein the characteristic is selected from the group consisting of: a beam-size of the light source and a position of the light source on the elongated handle.

8. The handheld implement of claim 1, further comprising a button that controls an operation of the light source.

9. The handheld implement of claim 8, wherein the button is positioned on at least one of: the light source and the elongated handle proximate to the end substantially opposite the implement head.

10. The handheld implement of claim 1, further comprising at least one segment of a reflective material coupled to the elongated handle.

11. The handheld implement of claim 1, wherein the implement head is selected from the group consisting of: a shovel head, a rake head, a hoe head, a mop head, and a broom head.

12. The handheld implement of claim 1, wherein the contoured arms partially surround the light source when the light source is located within the attachment mechanism.

13. The handheld implement of claim 1, wherein the attachment mechanism comprises a middle portion connected to the contoured arms and contoured legs and located between the elongated handle and light source when the light source is located within the attachment mechanism attached to the elongated handle.

14. A handheld implement, comprising:
    an elongated handle comprising a first end and a second end substantially opposite the first end;
    an implement head located at and mechanically attached to one of: the first end and the second end;
    a light source mechanically coupled to an external portion of and along a longitudinal axis of the elongated handle wherein the light source is positioned at a location on the elongated handle such that a least a portion of light that emits from the light source illuminates an area proximate to the implement head, wherein the light source is mechanically coupled to the elongated handle via a clip removable from the elongated handle and positionable at a plurality of locations along the longitudinal axis of the elongated handle and wherein a portion of the clip squeezes the elongated handle, wherein the light source is removable from the clip, wherein the clip receives and holds the light source utilizing contoured arms, wherein a first of the contoured arms is positioned on one side of the light source when the light source is located within the attachment mechanism and wherein a second of the contoured arms is positioned on another side of the light source substantially opposite the first contoured arm;

a beam-size of the light source of the light source being user-modifiable; and a power source powering the light source, wherein the power source is selected from the group consisting of a solar cell and a battery.

15. The handheld implement of claim 14, wherein the clip is a clip selected from the group consisting of: a spring clip and a tension clip.

16. The handheld implement of claim 14, further comprising a power cable electrically coupled to the light source and having a plug terminating proximate to the end substantially opposite the implement head, wherein the power cable, when attached to a power source, provides power to at least one of: the light source and the power source.

17. The handheld implement of claim 14, wherein a portion of the attachment mechanism, when coupled to the elongated handle, squeezes the elongated handle.

* * * * *